United States Patent
Lee

(10) Patent No.: US 7,466,820 B2
(45) Date of Patent: Dec. 16, 2008

(54) ROTATING APPARATUS FOR LIQUID CRYSTAL DISPLAY

(75) Inventor: Dae-Eop Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 770 days.

(21) Appl. No.: 11/004,825

(22) Filed: Dec. 7, 2004

(65) Prior Publication Data
US 2005/0163558 A1    Jul. 28, 2005

(30) Foreign Application Priority Data
Jan. 28, 2004    (KR) .................. 10-2004-0005519

(51) Int. Cl.
H04M 1/00 (2006.01)
H04M 9/00 (2006.01)
(52) U.S. Cl. .................. 379/428.03; 379/454; 248/919
(58) Field of Classification Search ........... 379/428.01, 379/433.11–433.13, 447, 454; 361/681; 403/45; 345/1.1; 248/919, 920, 921, 923; 16/326, 327, 324
See application file for complete search history.

(56) References Cited

U.S. PATENT DOCUMENTS

| 4,533,105 | A | 8/1985 | Cornwell, Jr. et al. |
| 4,571,456 | A | 2/1986 | Paulsen et al. |
| 4,989,167 | A | 1/1991 | Kapec et al. |
| 5,257,164 | A | 10/1993 | Perez et al. |
| 5,497,296 | A | 3/1996 | Satou et al. |
| 5,689,400 | A | 11/1997 | Ohgami et al. |
| 5,691,880 | A | 11/1997 | Seto et al. |
| 5,764,476 | A | 6/1998 | Ohgami et al. |
| 5,796,579 | A | 8/1998 | Nakajima et al. |
| 5,808,860 | A | 9/1998 | Ohgami et al. |
| 5,881,985 | A | 3/1999 | Hoenig |
| 2004/0075979 | A1 | 4/2004 | Wang et al. |

FOREIGN PATENT DOCUMENTS

| JP | 08-272307 | 10/1996 |
| KR | 1997-0031647 | 6/1997 |
| KR | 2000-0014351 | 3/2000 |

Primary Examiner—Curtis Kuntz
Assistant Examiner—Tuan D Nguyen
(74) Attorney, Agent, or Firm—Robert E. Bushnell, Esq.

(57) ABSTRACT

A rotating apparatus for a liquid crystal display comprises: a main body provided with a mounting recess having a predetermined radius of curvature; a liquid crystal display provided, at its bottom surface, with a curved portion corresponding to the mounting recess so that the curved portion rotates in surface contact with the surface of the mounting recess; and an angle regulator for guiding the rotation, in a predetermined direction, of the LCD and setting a position of the LCD when rotated to a predetermined position. The angle regulator includes: a plurality of bosses protruding from the bottom surface of the LCD; guide holes formed along a curvature of the mounting recess so as to form passageways through which the bosses are rotated; guide rails protruding from both sides of the guide holes toward the bottom surface of the mounting recess; and sliders which slide along the guide rails and engage the bosses.

10 Claims, 11 Drawing Sheets

ROTATING APPARATUS FOR LIQUID CRYSTAL DISPLAY

CLAIM OF PRIORITY

This application makes reference to, incorporates the same herein, and claims all benefits accruing under 35 U.S.C. §119 from an application entitled ROTATING APPARATUS FOR LIQUID CRYSTAL DISPLAY earlier filed in the Korean Intellectual Property Office on 28 Jan. 2004 and thereby duly assigned Serial No. 2004-5519.

BACKGROUND OF THE INVENTION

1. Technical Field

The present invention relates to a rotating apparatus for a liquid crystal display and, more particularly, to a rotating apparatus for a liquid crystal display capable of enabling a fine angle adjustment and simplifying its rotation structure by rotating the entire liquid crystal display in such a manner that angle adjustment of the liquid crystal display is made by a surface contact of its lower surface rather than by a hinge shaft.

2. Related Art

Generally, an electronic device such as a telephone (e.g., key-phone terminal), a printer, etc. employs a liquid crystal display (hereinafter refer to as 'LCD') to display a set operation mode and an operational state of the device as a user manipulates a button of the device.

The LCD is constituted so as to enable angle adjustment of the LCD from a main body of the electronic device (such as the telephone or the printer), thereby providing convenience of use.

An example of an angle adjusting device of an LCD has been disclosed in Korean Patent Publication No. 1997-0031647, entitled ANGLE ADJUSTING DEVICE FOR LCD OF A TELEPHONE filed by the assignee of the present invention.

In the angle adjusting device for the LCD of the telephone, a wired or wireless telephone comprises: an upper cover provided with an LCD mounted thereon and fixed thereto by a screw; a lower cover engaged with the upper cover and fixed to an upper housing of the telephone; a hinge enabling the upper cover and the lower cover to be rotated within a predetermined angle; a first groove, a second groove, a third groove and a fourth groove for indicating an angle of the LCD, respectively; a lock for locking the LCD after the completion of the angle adjustment of the LCD; a resilient member which pushes the lock into inner parts of the grooves by a resilient force when the lock protrudes into inlets of the first to fourth grooves; and a handle for moving the upper cover and the lower cover upward and downward. The angle adjustment step of the LCD is composed of four steps.

However, the conventional LCD angle adjusting device, as described above, has a problem in that fine angle adjustment is impossible since the angle adjustment is accomplished by the predetermined four steps.

In addition, prior art arrangements have other problems, such as increase in the number of parts, excessive assembly time, and an unacceptable failure rate, since the lock is supported by the resilient means so as to require a large number of parts for adjusting the angle of the LCD.

In order to solve the problems described above, the present inventor has disclosed a new configuration in Korean Patent No. 10-0299130, entitled ANGLE ADJUSTING STRUCTURE FOR AN LCD.

A vertical angle adjusting device of an LCD can be vertically rotated about a coupling axis by hinging both side walls of a mounting recess of a main body housing with both sides of one end of the LCD. The vertical angle adjustment device is installed at a lower case of the LCD, is provided with a sawtooth thread formed like a part of a circular gear about the coupling axis, and a resilient rib integrally formed with the housing at the mounting recess of the main body housing so as to correspond with the sawtooth thread. A sharply protruding shape is coupled with the sawtooth thread, and when the LCD is rotated about the coupling axis, the end part of the resilient rib is inserted and fixed into recesses of the sawtooth thread by stages.

However, the latter configuration has a problem in that the above composition still cannot accomplish a very fine and smooth angle adjustment, although its angle adjustment width is somewhat decreased in comparison to the former configuration.

Further, the latter configuration is also burdened by an inferior design due to external protrusion of the angle adjusting device.

The following patents are considered to be generally pertinent to the present invention, but are burdened by the disadvantages set forth above: U.S. Pat. No. 5,808,860 to Ohgami et al., entitled PORTABLE ELECTRONIC APPARATUS WITH DETACHABLY MOUNTED KEYBOARD, issued on Sep. 15, 1998; U.S. Pat. No. 5,764,476 to Ohgami et al., entitled PORTABLE ELECTRONIC APPARATUS HAVING A BASE A DISPLAY AND A MICROPHONE, issued on Jun. 9, 1998; U.S. Pat. No. 5,497,296 to Satou et al., entitled ELECTRONIC APPARATUS WITH HINGED DISPLAY AND LATCH MECHANISM FOR RELEASABLY LATCHING DISPLAY IN CLOSED POSITION, issued on Mar. 5, 1996; U.S. Pat. No. 5,691,880 to Sato et al., entitled PORTABLE ELECTRONIC APPARATUS HAVING A HINGE MECHANISM WHICH ROTATABLY CONNECTS A FLAT DISPLAY UNIT TO A HOUSING INCORPORATING A FRAME FOR SUPPORTING A CIRCUIT BOARD, issued on Nov. 25, 1997; U.S. Pat. No. 4,571,456 to Paulsen et al., entitled PORTABLE COMPUTER, issued on Feb. 18, 1986; U.S. Pat. No. 5,796,579 to Nakajima et al., entitled PORTABLE ELECTRONIC APPARATUS HAVING EXPANSION CONNECTOR COVERED BY PIVOTALLY MOUNTED UPPER AND LOWER COVERS HAVING LATERALLY EXTENDING GUIDE PORTIONS, issued on Aug. 18, 1998; and U.S. Pat. No. 5,689,400 to Ohgami et al., entitled PORTABLE ELECTRONIC APPARATUS INCLUDING SPACE-SAVING COMPONENT MOUNTING FEATURES, issued on Nov. 18, 1997.

SUMMARY OF THE INVENTION

It is, therefore, an object of the present invention to provide a rotating apparatus for an LCD capable of finely adjusting an angle of the LCD and smoothly adjusting the same.

It is another object of the present invention to provide a rotating apparatus for an LCD capable of decreasing shaking of the LCD by decreasing the tolerance of parts through a simplified composition of the angle adjusting device.

It is a further object of the present invention to provide a rotating apparatus for an LCD capable of decreasing noise on adjusting the angle by constituting the angle adjusting device in a sliding type arrangement or configuration.

It is still another object of the present invention to provide a rotating apparatus for an LCD capable of smoothly accomplishing angle adjustment of the LCD by rotating the LCD through a line contact.

According to an aspect of the present invention, there is provided a rotating apparatus for an LCD comprising: a main body provided with a mounting recess having a predetermined radius of curvature; an LCD provided with a curved portion, corresponding to the mounting recess, at its bottom surface so as to allow the curved portion to be rotated in line contact with the surface of the mounting recess; and an angle regulator for guiding rotation, in a predetermined direction, of the LCD, and setting a rotational position of the LCD to a predetermined position.

At least one first rib protrudes at an inner surface of the mounting recess, and a second rib protrudes at an alternate position of the first rib at a bottom surface of the curved portion.

The angle regulator includes: a plurality of bosses protruding from the bottom surface of the LCD; guide holes formed along a curvature of the mounting recess to form passageways through which the bosses are rotated; guide rails protruding from both sides of the guide holes toward the bottom surface of the mounting recess; and sliders which slide along the guide rails and engage the bosses.

Each slider includes a pressing surface contacting an upper surface of the guide rail, and side surfaces bent perpendicular to both sides of the pressing surface so as to be inserted between both side surfaces of the guide rail. A gap between the side surfaces is smaller than that between exterior side surfaces of the guide rail so as to be tightly fitted therein.

A first contact protrusion in line contact with the upper surface of the guide rail is formed at an inner portion of the pressing surface of the slider; a second contact protrusion in surface contact with the exterior surface of the guide rail is additionally formed at an inner portion of both side surfaces of the slider; and a boss groove, in which an upper end of the boss is inserted, is additionally formed at the inner portion of the pressing surface of the slider.

A rounded portion, having a curvature corresponding to the curvature of the guide rail, is formed at lower ends of both side surfaces of the slider using POM (polyoxymethylene) as a self-lubricant material.

The slider and the boss are fastened by a fastening screw, and the tightening force of the fastening screw is greater than a rotational force by weight of the LCD.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
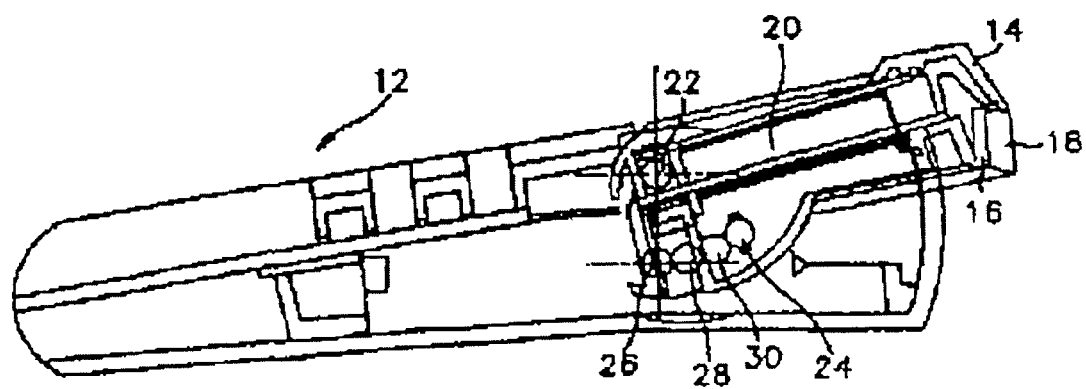
FIGS. 1 and 2 illustrate a configuration of an angle adjusting device for a liquid crystal display.

The present invention will now be described more fully with reference to the accompanying drawings, in which preferred embodiments of the invention are shown. This invention may, however, be embodied in different forms, and the invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity, and like numbers refer to like elements throughout the specification.

Figure 2:
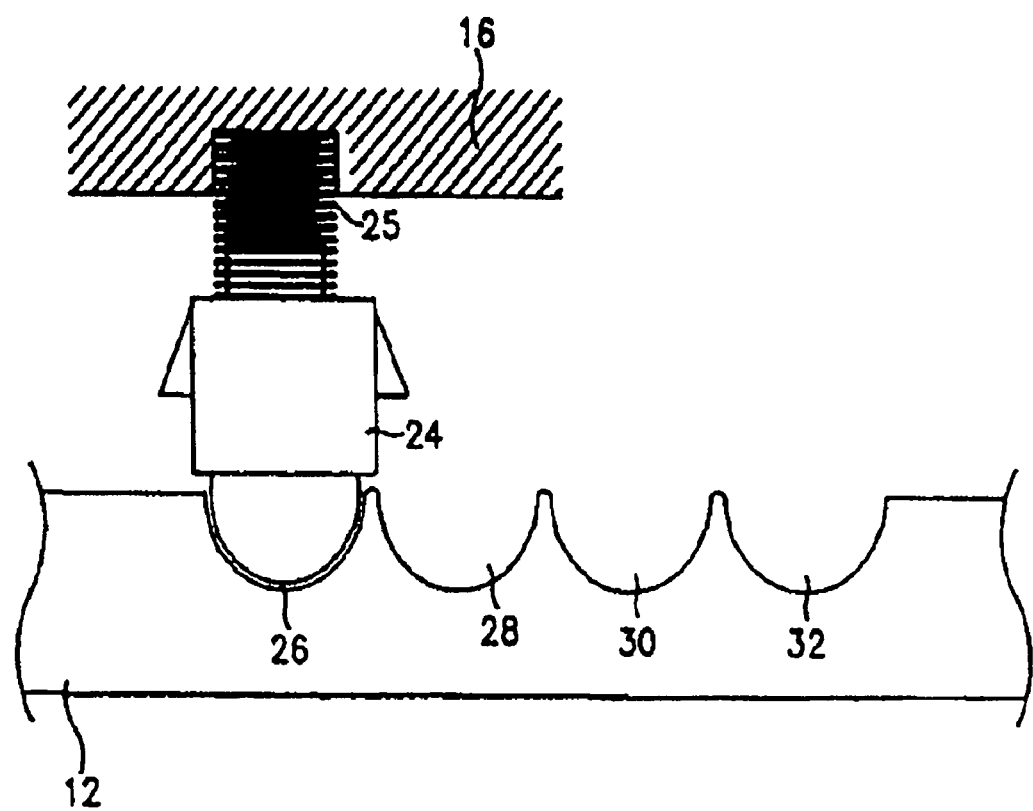

Referring to FIGS. 1 and 2, in the angle adjusting device for the LCD of a telephone, a wired or wireless telephone comprises: an upper cover 14 provided with an LCD 20 mounted thereon and fixed thereto by a screw; a lower cover 16 engaged with the upper cover 14 and fixed to an upper housing 12 of the telephone; a hinge 22 enabling the upper cover 14 and the lower cover 16 to be rotated within a predetermined angle; a first groove 26, a second groove 28, a third groove 30 and a fourth groove 32 for indicating an angle of the LCD 20, respectively; a lock 24 for locking the LCD 20 after the completion of the angle adjustment of the LCD 20; a resilient member 25 which pushes the lock 24 into inner parts of the grooves by a resilient force when the lock 24 protrudes into inlets of the first to fourth grooves 26, 28, 30 and 32; and a handle 18 for moving the upper cover 14 and the lower cover 16 upward and downward. The angle adjustment step of the LCD 20 is composed of four steps.

However, the LCD angle adjusting device as described above has a problem in that fine angle adjustment is impossible since the angle adjustment is accomplished by the predetermined four steps.

In addition, the LCD angle adjusting device as described above has other problems, specifically, an increased number of parts, an excessive assembly time, and an unacceptable failure rate, since the lock 24 is supported by the resilient member 25 so as to require a large number of parts for adjusting the angle of the LCD.

Figure 3:
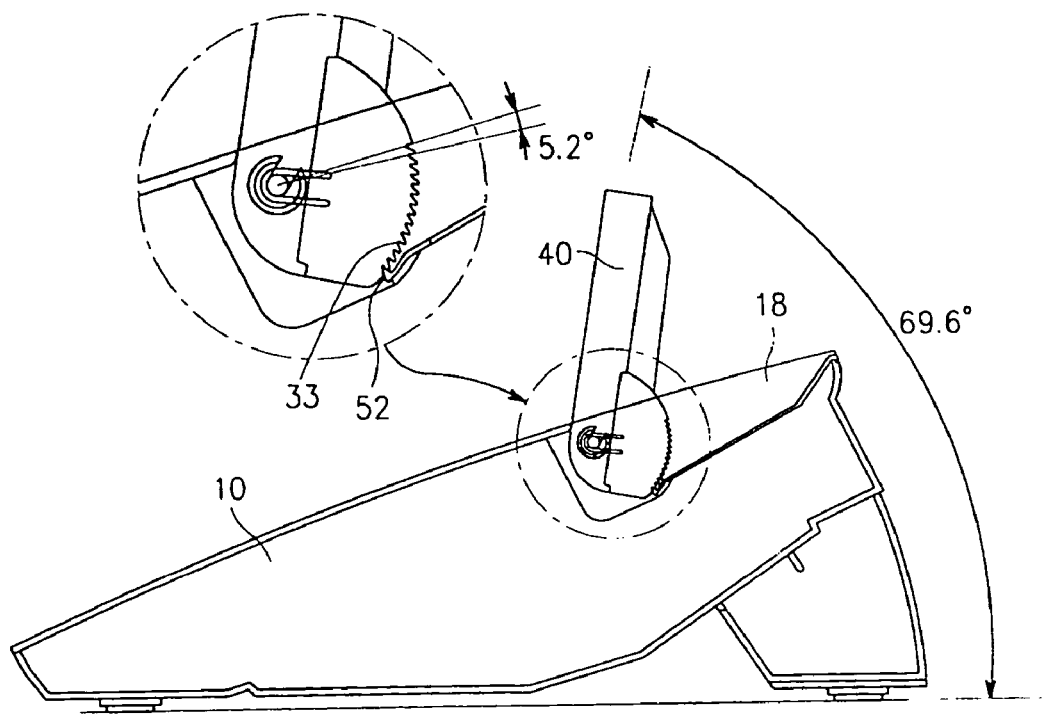
FIG. 3 illustrates another configuration of an angle adjusting device for a liquid crystal display.

Referring to FIG. 3, a vertical angle adjusting device of an LCD 40 can be vertically rotated about a coupling axis by hinging both side walls of a mounting recess 18 of a main body housing 10 with both sides of one end of the LCD 40. The vertical angle adjustment device is installed at a lower case of the LCD 40, and is provided with a sawtooth thread 33 formed like a part of a circular gear about the coupling axis, and a resilient rib 52 integrally formed with the housing at the mounting recess 18 of the main body housing 10 so as to correspond with the sawtooth thread. A sharply protruded shape is coupled with the sawtooth thread, and when the LCD 40 is rotated about the coupling axis, the end part of the resilient rib 52 is inserted and fixed into recesses of the sawtooth thread by stages.

However, the latter configuration has a problem that the above composition still cannot accomplish a very fine and smooth angle adjustment, although its angle adjustment width is somewhat decreased in comparison to the former configuration.

Furthermore, the latter configuration also is burdened by an inferior design due to external protrusion of the angle adjusting device.

Figure 4:
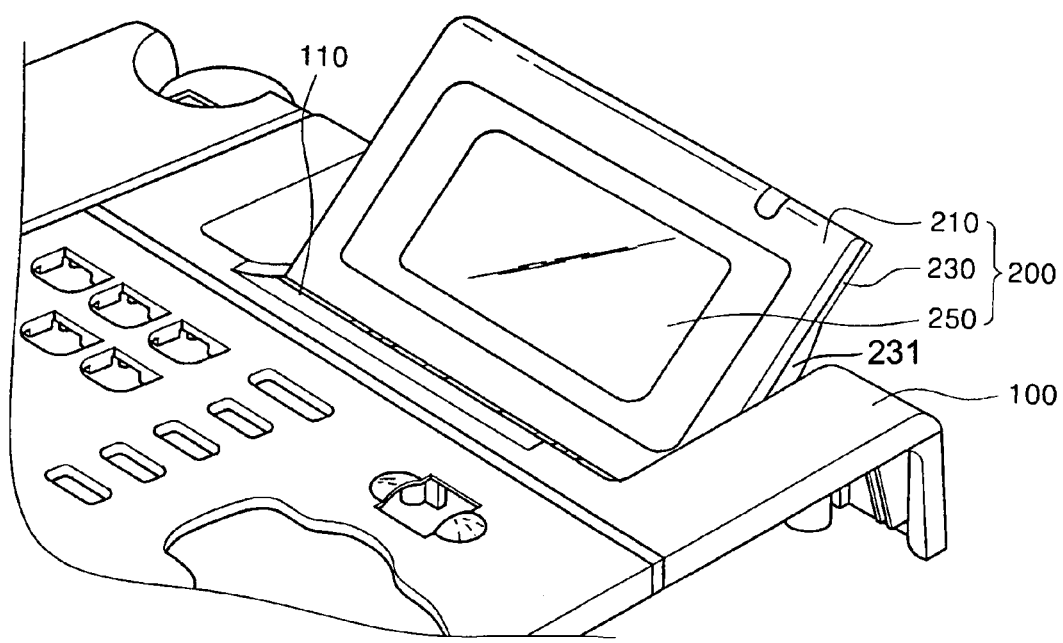
FIG. 4 illustrates an angle adjusting device for a liquid crystal display in accordance with an embodiment of the present invention.

As shown in FIG. 4, a main body 100 (shown as a key phone terminal) is provided with a mounting recess 110 having a predetermined radius of curvature so that the LCD 200 is rotatably mounted in a vertical direction.

The LCD 200 is provided with an upper case 210, a lower case 230, and an LCD plate 250 installed between the cases 210 and 230. A curved portion 231, having a predetermined radius of curvature corresponding to the mounting recess 110, is formed at a lower side of a bottom surface of the lower case 230.

Figure 5:
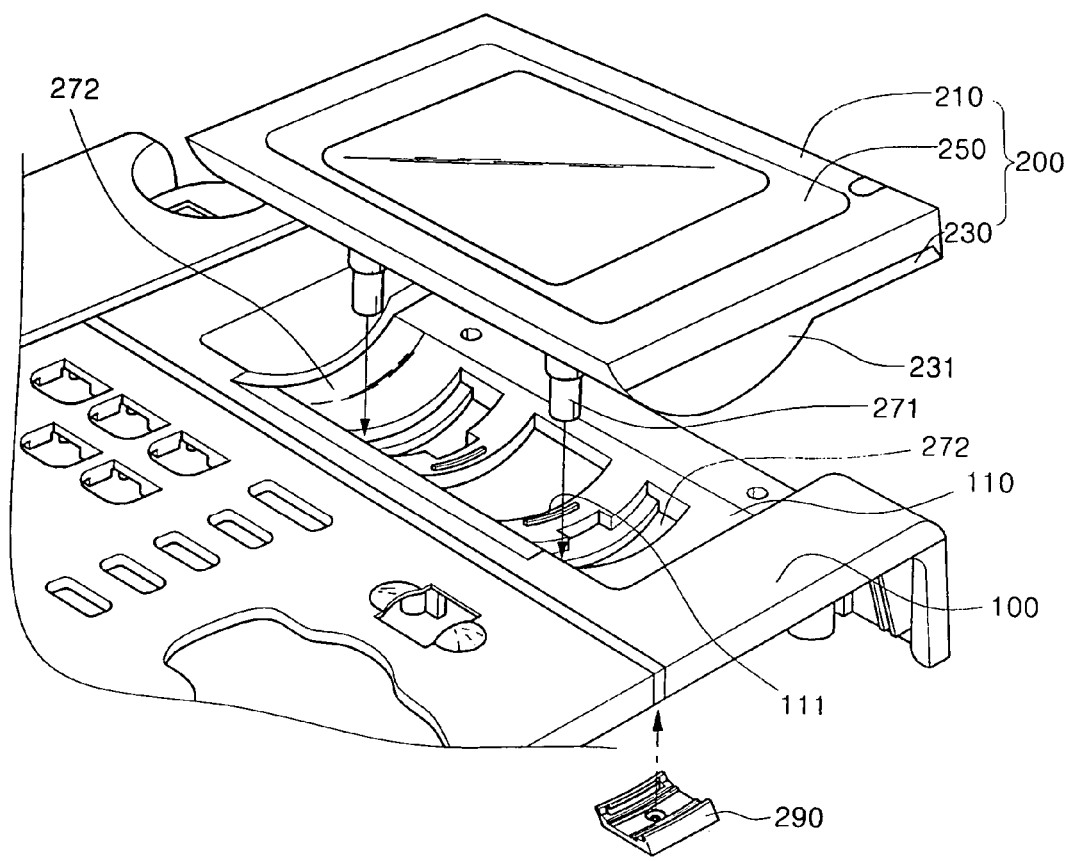
FIG. 5 is a disassembled view of an angle adjusting device for a liquid crystal display in accordance with an embodiment of the present invention.
Figure 11:
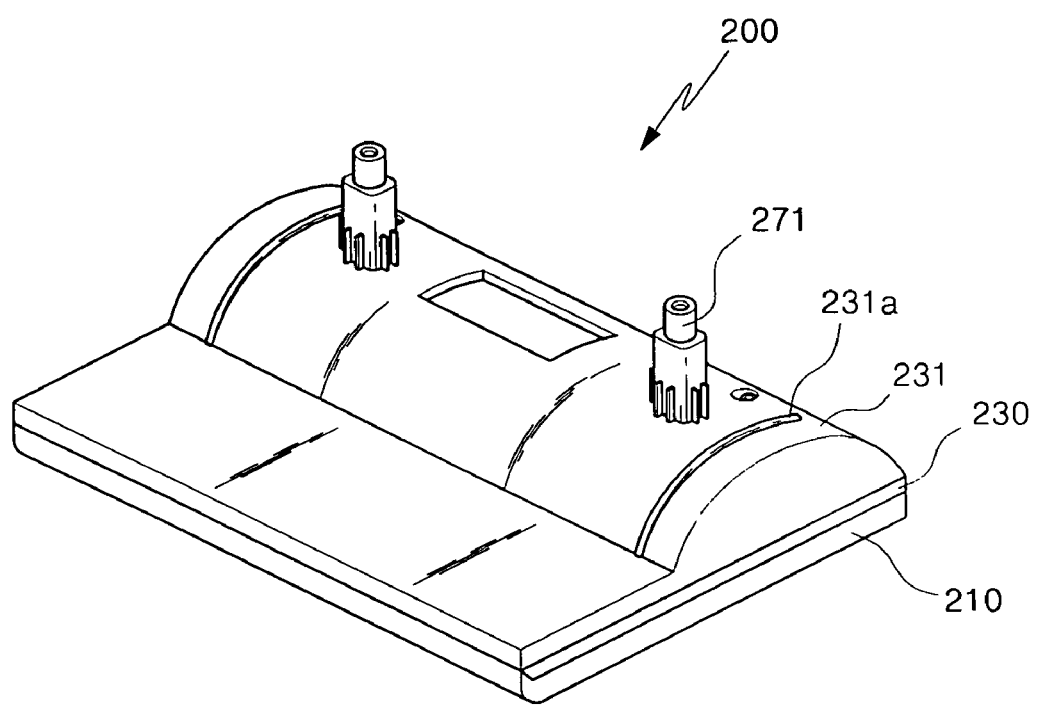
FIG. 11 illustrates a bottom surface of the LCD in accordance with an embodiment of the present invention.

As shown FIGS. 5 and 11, a first rib 111 in line contact with a bottom surface of the curved portion 231 protrudes from the inner surface of the mounting recess 110, and a second rib 231a in line contact with the inner surface of the mounting recess 110 protrudes in an alternate position with the first rib 111 at a bottom surface of the curved portion 231.

In this connection, the height of the first rib 111 is made greater than that of the second rib 231a, and the bottom surface of the curved portion 231 initially contacts the upper surface of the first rib 111. The second rib 231a is additionally manufactured in consideration of the distribution of force or a difference between heights of each part, and the like.

As described above, the LCD 200 is constructed so that the curved portion 231 can be smoothly and vertically rotated by line contact with the mounting recess 110, and thereby rotated by an angle regulator 270 (see FIG. 6) at a predetermined angle, and then stopped.

As shown in FIGS. 5 to 8, the angle regulator 270 includes: a plurality of bosses 271 protruding from the bottom surface of the LCD 200; a guide hole 272 formed along a curvature of the mounting recess 110 to form a passageway through which the boss 271 is rotated; a guide rail 273 protruding at both sides of the guide hole 272 toward the bottom surface of the mounting recess 110; and a slider 290 for sliding along the guide rail 273 and engaging with the boss 271.

Figure 10:
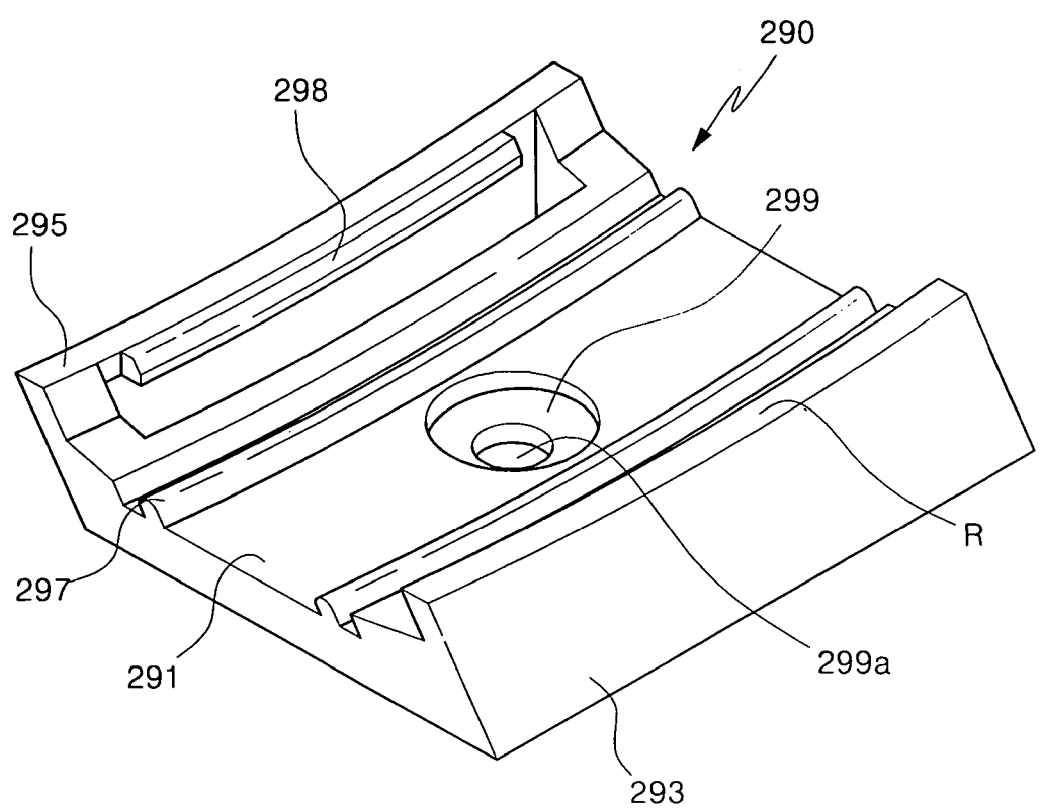
FIG. 10 is a perspective view illustrating a configuration of a slider of the present invention.

As shown in FIG. 10, the slider 290 includes a pressing surface 291 contacting an upper surface of the guide rail 273, and side surfaces 293 and 295 bent at a right angle relative to both sides of the pressing surface 291 for insertion between both side surfaces of the guide rail 273.

Figure 6:
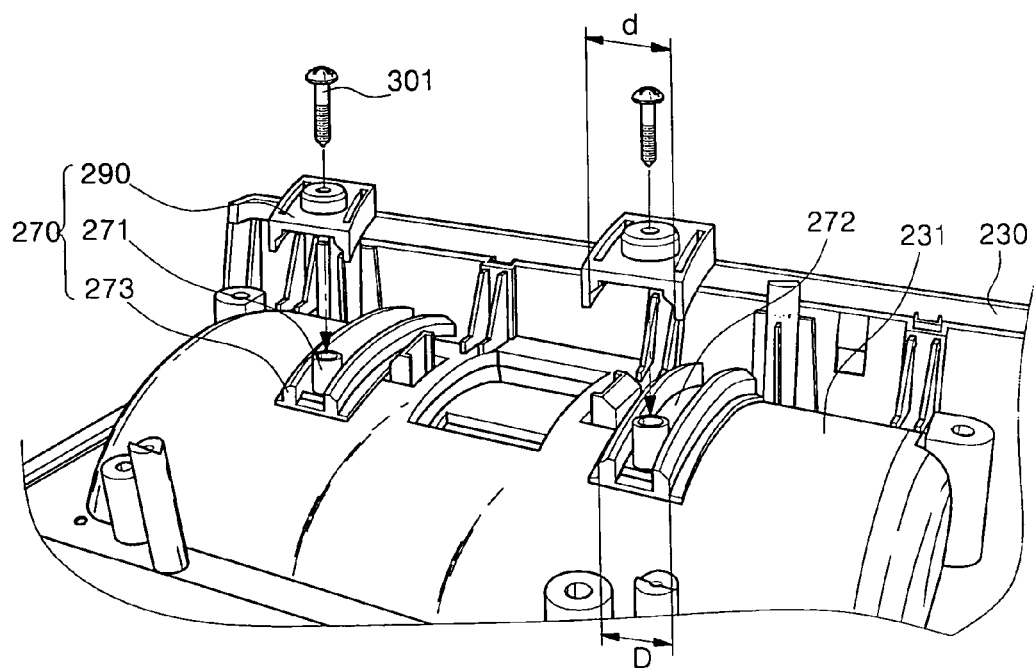
FIG. 6 illustrates a bottom surface of the arrangement of FIG. 5.
Figure 7:
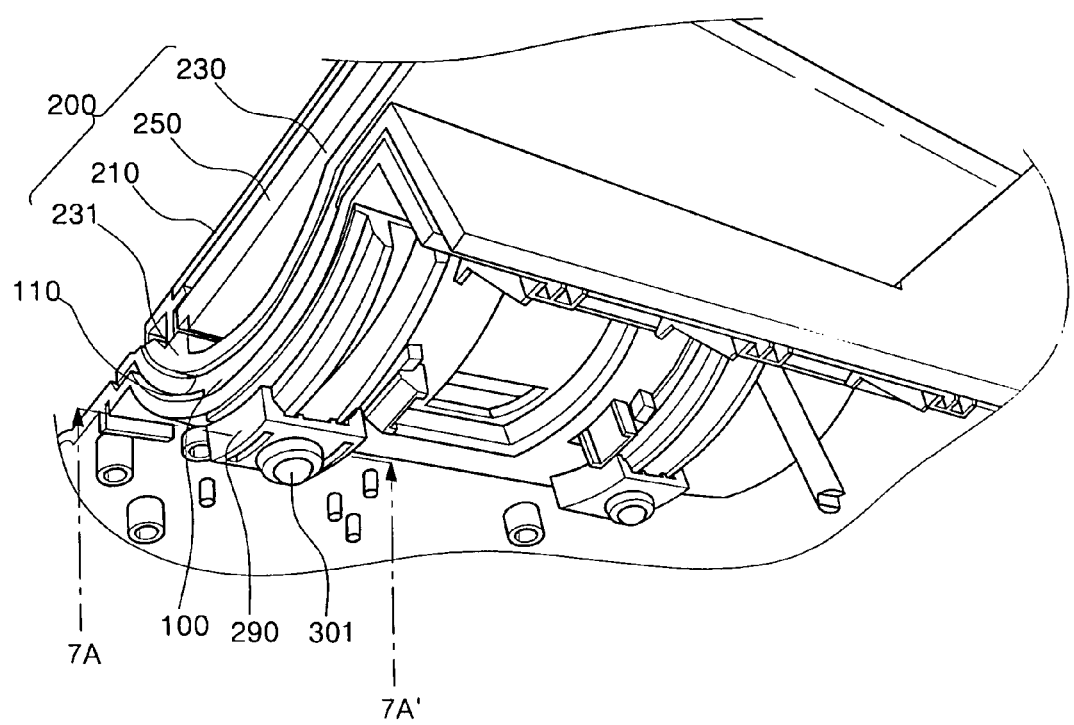
FIG. 7 illustrates a bottom surface of an angle adjusting device for a liquid crystal display in accordance with an embodiment of the present invention.
Figure 8:
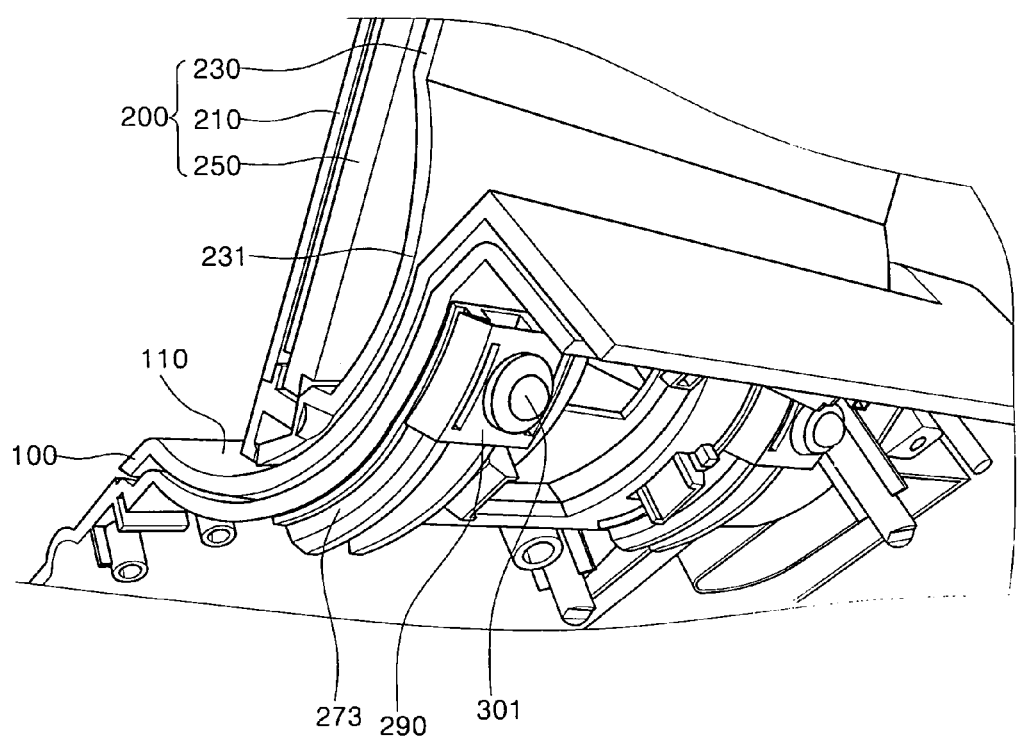
FIG. 8 illustrates a rotated state of the bottom surface of the angle adjusting device for a liquid crystal display in accordance with an embodiment of the present invention.

A gap d between both side surfaces 293 and 295 is, as shown in FIG. 6, smaller than a gap D between exterior surfaces of the guide rail 273 so as to achieve a tight fit therein. Therefore, when the LCD 200 is angularly adjusted, lateral movement (in a direction perpendicular to the side surface of the guide rail 273) is prevented.

A first contact protrusion 297 (see FIG. 10) in line contact with the upper surface of the guide rail 291 is formed at an inner portion of the pressing surface 291 of the slider 290, and a second contact protrusion 298 in surface contact with the exterior surface of the guide rail 273 is additionally formed at an inner portion of both side surfaces 293 and 295 of the slider 290.

The first and second contact protrusions 297 and 298 serve to decrease contact area between the slider 290 and the guide rail 273.

A boss groove 299, in which an upper end of the boss 271 is inserted, is additionally formed at the inner portion of the pressing surface 291 of the slider 290. In this connection, a through-hole 299a is formed at a center portion of the boss groove 299 so as to connect the slider 290 and the boss 271 by passing through a fastening screw 301 (see FIG. 6).

The fastening screw 301 provides a force for supporting the LCD 200 rotated to a predetermined position by adjusting its tightening force.

A rounded portion R (see FIG. 10) having a curvature corresponding to the curvature of the guide rail 273 is formed at lower ends of both side surfaces 293 and 295 of the slider 290. As a result, the slider 290 precisely engages the guide rail 273 so as to provide for smooth rotation of the LCD 200. In addition, the slider 290 uses POM (polyoxymethylene) as an abrasion resisting and self-lubricant material.

Hereinafter, the angle adjusting operation of the LCD 200 in accordance with an embodiment of the present invention will be described.

First, when a user pushes an upper or lower center portion of the LCD 200 (see FIG. 4) to adjust the angle of the LCD 200, the curved portion 231 protruding from the lower case 230 of the LCD 200 is slid along the mounting recess 110 of the main body 100. At this point, the curved portion 231 is rotated in line contact with the first rib 111 formed at the bottom surface of the mounting recess 110 and the second rib 231a (see FIG. 11) formed at the bottom surface of the curved portion 231 so as to be smoothly rotated.

On the other hand, the slider 290 (see FIG. 6) connected to the boss 271 is slid along the guide rail 273 during the rotation as described above, and the slider 290 is formed of a self-lubricant material to smoothly accomplish the sliding operation.

Figure 9:
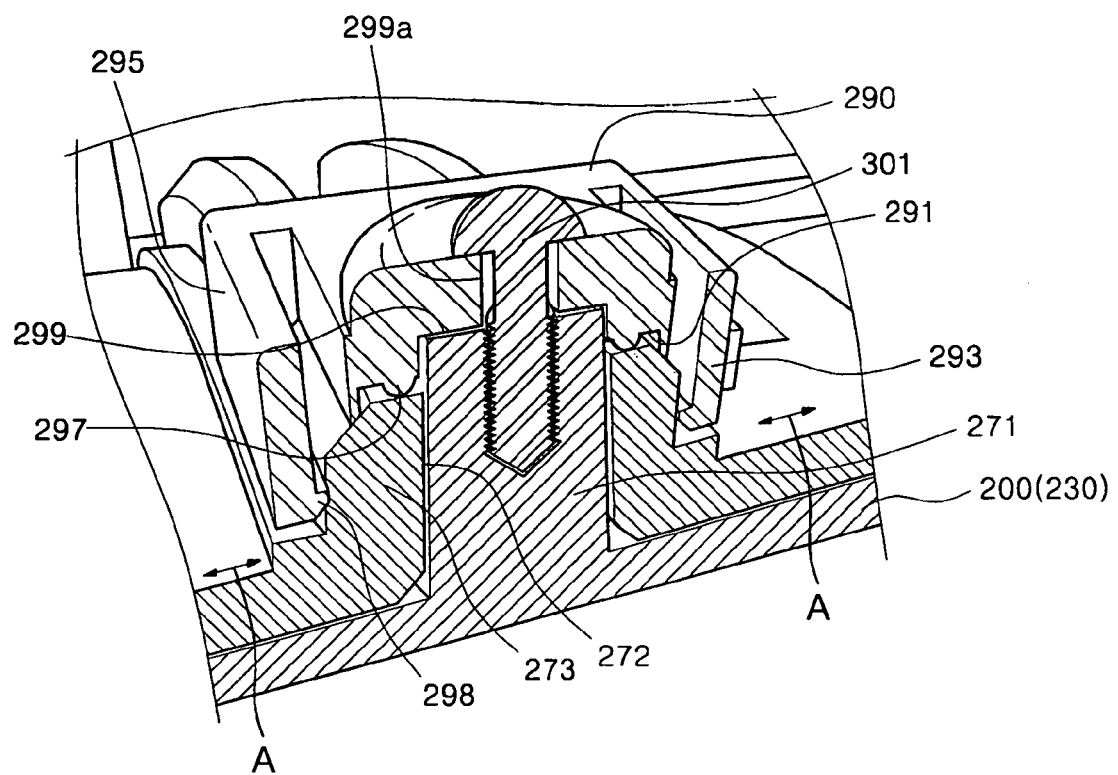
FIG. 9 is a cross-sectional view taken along the line 7A-7A' of FIG. 7.

Referring to FIGS. 6, 9 and 10, both side surfaces 293 and 295 of the slider 290 are tightly fitted to the both side surfaces of the guide rail 273 so as to prevent the LCD 200 from moving laterally in a direction perpendicular to both surfaces of the guide rail 273 (see arrows A in FIG. 9) so as to provide for stable rotation of the LCD 200.

When the user releases the force from the LCD 200, the LCD 200 maintains the rotated angle. At this point, since the tightening force of the fastening screw 301 is greater than the rotational force by weight of the LCD 200, the LCD 200 can be maintained in position.

When the LCD 200 is rotated as described above, the upper-limit angle and the lower-limit angle are determined since the boss 271 is stopped by both ends of the guide hole 272.

As described above, the present invention has the advantage of smoother rotation of the LCD 200 due to formation of the curved portion 231 at the bottom surface of the LCD 200, provision of the mounting recess 110 corresponding to the curved portion 231 at the main body, and formation of the first rib 111 and second rib 231a at the mounting recess 110 and the curved portion 231, respectively, so that the LCD 200 is rotated by line contact.

In addition, the present invention has another advantage of decreased noise when adjusting the angle due to use of the guide rail 273 and the slider 290 during rotation of the LCD 200.

The present invention has a further advantage in that shaking of the LCD 200 is reduced by decreasing tolerance of parts through simplification of the composition of the angle adjusting device resulting, in part, from use of guide rail 273 and the slider 290 during rotation of the LCD 200.

While this invention has been described in connection with what is presently considered to be the most practical and preferred embodiment, it is to be understood that the invention is not limited to the disclosed embodiment, but on the contrary, it is intended to cover various modification within the spirit and the scope of the appended claims.

What is claimed is:

1. A rotating apparatus for a liquid crystal display, comprising:
   a main body provided with a mounting recess having a curved surface;
   a liquid crystal display (LCD) having a bottom surface and provided at the bottom surface with a curved portion corresponding to the curved surface of the mounting recess so that the curved portion rotates in line contact with the curved surface of the mounting recess when the LCD is mounted in the mounting recess;
   an angle regulator for guiding rotation of the LCD, and for setting a position of the LCD when the LCD is rotated to a predetermined position; and
   at least one first rib protruding from the curved surface of the mounting recess, and a second rib protruding, in an alternate position with the first rib, from the curved portion at the bottom surface of the LCD.

2. The rotating apparatus according to claim 1, wherein the angle regulator includes:
   at least one boss protruding from the bottom surface of the LCD;
   at least one guide hole formed in the curved surface of the mounting recess so as to form a passageway through which said at least one boss extends and is rotated;
   guide rails disposed at respective sides of said at least one guide hole and protruding from a bottom surface of the mounting recess; and
   at least one slider mounted on the bottom surface of the mounting recess so as to engage said at least one boss for sliding along a respective said guide rail.

3. The rotating apparatus according to claim 2, wherein said at least one slider includes a pressing surface which contacts an upper surface of a respective guide rail, and side surfaces disposed perpendicular to the pressing surface so as to engage respective side surfaces of said respective guide rail when said at least one slider is mounted on the bottom surface of the mounting recess.

4. The rotating apparatus according to claim 3, wherein a gap between the side surfaces of the slider is smaller than a gap between exterior side surfaces of said respective guide rail prior to a combination of the slider and the guide rail so as to provide a tight fit between said at least one slider and said respective guide rail when the slider is combined with the guide rail.

5. The rotating apparatus according to claim 3, wherein a first contact protrusion in line contact with the upper surface of said respective guide rail is formed at an inner portion of the pressing surface of said at least one slider, and a second contact protrusion in surface contact with a respective exterior surface of said respective guide rail is additionally formed at an inner portion of the side surfaces of said at least one slider.

6. The rotating apparatus according to claim 3, wherein a boss groove, in which an end of a respective boss is inserted, is formed in the pressing surface of said at least one slider.

7. The rotating apparatus according to claim 3, wherein a rounded portion having a curvature corresponding to a curvature of said respective guide rail is formed at lower ends of the side surfaces of said at least one slider.

8. The rotating apparatus according to claim 2, wherein said at least one slider is made of a self-lubricant material.

9. The rotating apparatus according to claim 8, wherein the self-lubricant material is a polyoxymethylene (POM).

10. The rotating apparatus according to claim 2, wherein said at least one slider and a corresponding said at least one boss are fastened together by a fastening screw, and a tightening force of the fastening screw is greater than a rotational force by weight of the LCD.

* * * * *